Oct. 1, 1957  J. H. CAPPS  2,808,554

DUAL-VOLTAGE ALTERNATING-CURRENT MOTOR

Filed June 25, 1956

Inventor:
James H. Capps,
by Robert G. Irish
His Attorney.

United States Patent Office 2,808,554
Patented Oct. 1, 1957

2,808,554

DUAL-VOLTAGE ALTERNATING-CURRENT MOTOR

James H. Capps, Fort Wayne, Ind., assignor to General Electric Company, a corporation of New York Application June 25, 1956, Serial No. 593,571

2 Claims. (Cl. 318—221)

This application is a continuation-in-part of copending application Serial Number 510,615, filed May 24, 1955. The invention relates to dynamoelectric machines, and more particularly to an improved dual-voltage single-phase, alternating current induction-type motor.

There is a considerable number of applications where it is desirable that a single-phase, alternating current electric motor be capable of operating on two different voltages, one twice the other, such as, for instance, 115 volts and 230 volts. A standard means of achieving a dual-voltage motor is to provide a main winding made up of two oppositely wound sections which are connected in parallel at the lower voltage and in series at the high voltage, with each section being wound on half of the poles. Such motors are normally provided with a starting winding which is in spatial and phasic displacement from the main winding so as to cooperate therewith to provide a starting torque. The starting winding is connected in parallel with both sections of the main winding at the lower voltage. However, to provide a similar starting torque at the higher voltage without major winding changes, it is necessary to connect the starting winding in series with one section of the main winding and in parallel with the other section. This connection has the effect of unbalancing the ampere-turns of the two sections of the main winding and producing excessive spatial harmonics in the airgap magnetomotive force which seriously affect the torque curve as the motor comes up to speed.

To avoid this unbalancing effect, it has in the past been necessary to provide two complete main windings so that, at the higher voltage, the starting winding could be connected across a complete main winding and in parallel with a complete main winding. The term "complete main winding" refers to a winding having the same number of coils physically arranged in the same manner as in the case of the single main winding motor described above. When two such windings are used, each coil occupies only half of the space in each slot that the single main winding coil occupied because it has approximately only half the number of turns, and the windings are arranged so that they occupy the same slots, that is, each main winding slot receives a coil of each main winding.

While such an arrangement achieves the desired effect of substantially reducing the poor starting characteristics, it increases the cost of the motor considerably, because of the work involved in dividing the same number of turns into twice the number of coils and inserting the larger number of coils in the slots. Thus, in the past, it has been necessary to select one of the two alternatives: either an additional complete main winding (with respect to the number of coils) is added thereby increasing the cost; or the single main winding is used thereby causing an undesirable dip in the torque as the motor comes up to speed. It is most desirable to provide a motor which will have the performance characteristics of the first alternative while retaining the economical features of the second.

It is, therefore, an object of this invention to provide an improved dual-voltage, single-phase, alternating current induction motor which will incorporate the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broadest aspect, this invention provides a dual-voltage, single-phase, alternating current induction motor whose stator has a main winding made up of two sections connected in parallel for operation at a first (lower) voltage and in series for operation at a second (higher) voltage. The stator also has a starting winding which is in spatial and phasic displacement from the main winding and is connected in parallel with both main winding sections at the lower voltage, and in series with one of the main winding sections and in parallel with the other main winding section at the high voltage. Each of the main winding sections consist of a number of coils arranged on each pole of the stator. The coils of each section on each pole are concentric with each other (where more than one coil of a section is provided) and with the coils of the other winding section, and no more than one main winding coil is arranged in any one slot. The coils are wound so as to provide poles of alternate polarity.

In this manner, the same number of coils is provided as in the case of previous arrangements where single main windings were provided, but with the main winding ampere-turns substantially more balanced as a result of the coil arrangement during the starting condition when the motor is connected for high voltage operation. In addition to the tendency to equalize ampere-turns, the arrangement provides better coupling between the two sections so as to increase their mutual reactance, thereby further reducing the undesirable harmonics. While the number of coils of the dual-voltage, single main winding motor is retained, the type of performance is substantially that of the dual-voltage motor having two complete main windings.

Figure 1:
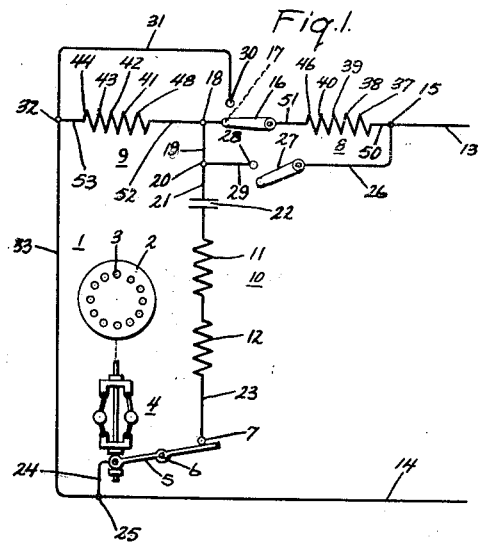
Figure 1 is a schematic diagram of the improved motor of this invention connected for operation at the higher voltage.
Figure 2:
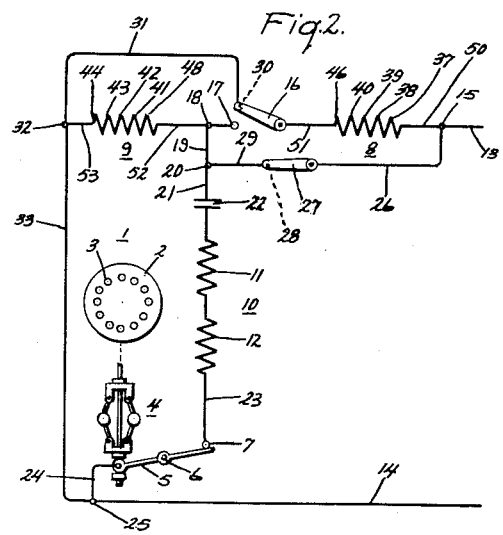
Figure 2 is a schematic diagram of the motor connected for operation at the lower voltage.

Referring now to Figures 1 and 2 of the drawing, there is shown a single phase alternating current motor of the induction type, generally indicated at 1, having a rotor 2 with squirrel cage winding conductors 3 extending therethrough and short circuited together at each end (not shown). Rotor 2 operates a centrifugal mechanism 4 which includes a contact arm 5 pivoted at 6. When rotor 2 is at rest, or is rotating below a predetermined speed, contact arm 5 is in the position shown so that it is in engagement with a contact 7; above the predetermined speed, centrifugal mechanism 4 will make contact arm 5 pivot about point 6 to separate from contact 7. Motor 1 has a main field winding which is made up of a pair of sections 8 and 9, and a starting winding 10 which includes a pair of oppositely wound sections 11 and 12.

Motor 1 is adapted to be connected across a source of single phase alternating current power by means of lines 13 and 14. Winding section 8 is joined to line 13 at point 15 through line 50 and is joined to section 9 through line 51, contact arm 16, contact 17, point 18 and line 52. From point 18, winding section 8 is connected in series with starting winding 10 through line 19, point 20, and line 21 which includes a phase displacing device such as capacitor 22. Starting winding 10, in turn, is connected to contact 7 through line 23, and contact arm 5 is connected through line 24 to line 14 at point 25. Starting winding 10 is further arranged to be connected in parallel with winding section 8 through a line 26 terminating in contact arm 27 which is arranged to engage a contact 28 connected to point 20 by a line 29. Contact arm 16 is arranged to be movable into engagement with a contact 30 which is joined through line 31, point 32, and line 33 to point 25 and line 14. Winding section 9 is connected to point 32 through line 53.

Figure 3:
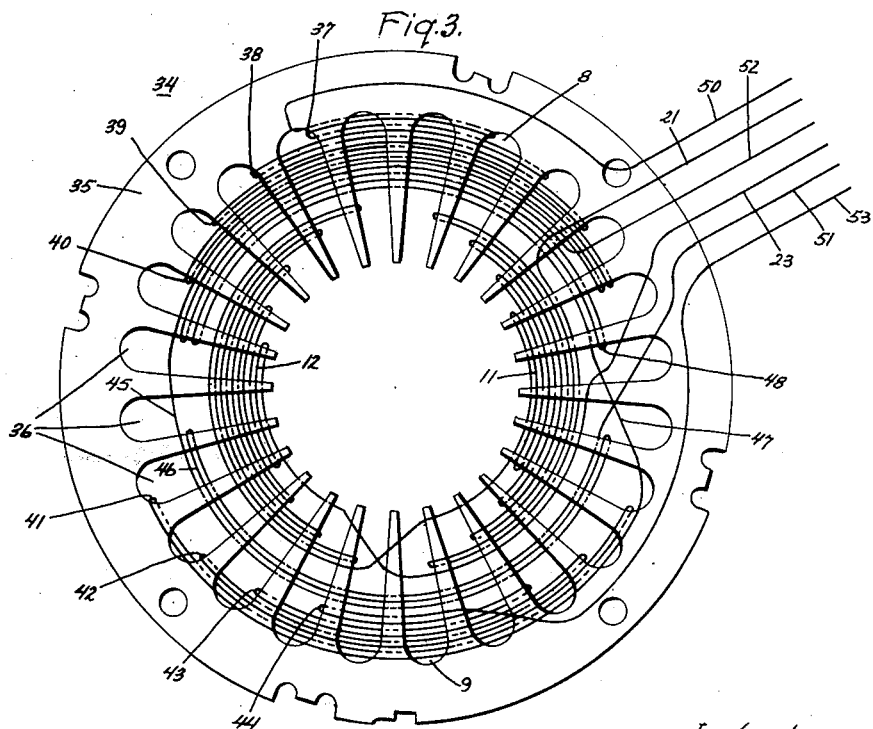
Figure 3 is an end view of a stator member incorporating the improved winding arrangement of this invention.

For operation at the higher voltage such as, for instance, 230 volts, motor 1 is connected as shown in Figure 1 with contact arm 16 in engagement with contact 17, and contact arm 27 out of engagement with contact 28. Main winding sections 8 and 9 are connected together in series through contact arm 16 and contact 17. Starting winding 10 is connected in series with winding section 8 through contact arm 16 and contact 17, and in parallel with winding section 9. The spatial displacement of sections 11 and 12 of starting winding 10 from winding sections 8 and 9 (see Figure 3), in combination with the phase displacement caused by capacitor 22, will create a starting torque which will cause the motor to start to rotate. As it comes up to speed, centrifugal mechanism 4 will cause contact arm 5 to separate from contact 7 thereby disconnecting starting winding 10, and motor 1 will continue to run on winding sections 8 and 9 in series.

When it is desired to operate motor 1 at a lower voltage, such as 115 volts, switch arm 16 is moved into engagement with contact 30 and contact arm 27 is moved into engagement with contact 28 as shown in Figure 2. The movement of contact arm 16 takes main winding section 8 out of series connection with main winding section 9. The closing of contact arm 27 in conjunction with the engagement of contact arm 16 with contact 30 serves to connect both main winding section 9 and starting winding 10 in parallel with main winding section 8. Since main winding section 9 and starting winding 10 are connected in parallel with each other as before, main winding sections 8 and 9 and starting winding 10 are all connected in parallel. As before, a starting torque will be created in the same manner, the motor will come up to speed, and at the predetermined speed starting winding 10 will be disconnected so that motor 1 will run on winding sections 8 and 9 alone connected in parallel with each other. It will, of course, be understood that any desired switching arrangement may be used to effect the connections described above, and that contact arms 16 and 27 and contacts 17, 30, and 28 have been described for purposes of illustration and not of limitation.

While the circuitry described above provides a relatively inexpensive means of achieving dual voltage operation, it will be observed that for the high voltage operation, the starting winding is in series with one of the main winding sections but in parallel with the other. This, in effect, creates a difference in the amount of current flowing through the main winding sections, i. e., there is a decrease in the ampere-turns of the section connection in parallel with the starting winding. Where each pole is entirely formed by the coils of one main winding section, this unbalance has been found to bring about excessive even spatial harmonics in the airgap magnetomotive force which harmfully affect the starting torque curve of the motor. In order to correct this undesirable situation without sacrificing the economy of the circuitry described, the physical arrangement illustrated in Figure 3 will now be described. Motor 1 is provided with a field member 34 which includes a core 35 preferably made up of thin laminations of magnetic material (only one of which is shown) and having formed therein a plurality of slots 36. Coils 37, 38, 39, and 40 of winding section 8 are positioned concentrically within the slots 36, as shown. Coils 41, 42, 43, and 44 of main winding section 9 are similarly concentrically positioned.

Connected to coils 37, 38, 39 and 40 by a line 45 is a coil 46 of section 8 which is positioned concentrically with coils 41, 42, 43, and 44 of winding section 9 to form a pole. Coil 46 is formed so as to have the same polarity as coils 41, 42, 43, and 44, and each of the five coils 41, 42, 43, 44, and 46 forming the pole has a different span, i. e., is arranged independently in different slots 36. Conversely, a coil 48 is connected to coils 41, 42, 43, and 44 of section 9 by a line 47 and is arranged concentrically with coils 37, 38, 39, and 40 of section 8 to form a pole. As before, each of the five coils 37, 38, 39, 40, and 48 has a different span and is the only main winding coil positioned in its particular slots 36. What, in effect, has been achieved is that each pole is made up of complementing coils from each main winding section, the two poles being formed alike with equivalent coils of the poles being formed from different main winding sections.

As explained before, with the high voltage connection winding section 8 will receive more current than winding section 9. Thus, coils 37, 38, 39, and 40 will provide a greater number of ampere-turns at the high voltage connection than coils 41, 42, 43, and 44 of section 9. However, on the other hand, coil 46 will provide a greater number of ampere-turns than coil 48. By this means, then, it is possible to equalize to a great extent the number of ampere-turns per pole of the machine. When the alternate oppositely wound poles have substantially different ampere-turns, a severe harmonics problem is encountered which causes an undesirable decrease, or dip, at certain points of the starting torque curve. The elimination of the unbalance in ampere-turns serves substantially to eliminate the problem brought about by the harmonics. Another beneficial result of the physical interchange of positions of coils 46 and 48 is that the arrangement substantially increases the mutual reactance between the winding sections 8 and 9. The greater the mutual reactance between the two winding sections, the more of a tendency there will be further to reduce the undesirable harmonics.

The starting winding sections 11 and 12 are wound in the usual manner, physically displaced from the main winding sections 8 and 9 as shown.

It will be seen from the foregoing that this invention provides an arrangement which will permit achievement of a relatively desirable torque curve as the motor comes up to speed when operated at the higher voltage while retaining the desired features of the more economical structure.

While, for the sake of clarity, a two pole machine has been illustrated, it will, of course, be understood that the invention is applicable to dual-voltage single phase induction motors having greater numbers of poles. Also, while the illustrated embodiment of the invention provides a single coil of wide span from one winding section and four other coils of lesser span from the other winding section for each pole, it will be understood that the exact make-up of each pole, so far as coils from one section or the other are concerned, is dependent upon many factors within the skill of the designer and thus may be varied accordingly; the important feature is each pole receives complementing coils from both main winding sections so that the number of coils remains the same as in the previous single main winding arrangement, at the same time that the ampere-turns of the different poles are equalized by the use of coils from each of the main winding sections. Of course, the number of turns of wire in each coil is selected to promote equalization of the ampere-turns. However, selection of these numbers is well within the skill of the designer in the light of the foregoing; further, the numbers will vary with each different motor design. An essential feature is that the coils be arranged in the slots so as to complement each other in that only one main winding coil is necessary in any one slot to achieve substantial equalization of ampere-turns and an increase of mutual reactance between the winding sections.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. A dual voltage single phase alternating current induction-type motor having a slotted stator including a main winding comprising two sections connected in parallel for operation at one voltage and connected in series for operation at another voltage, and a starting winding displaced from said main winding and connected in parallel with both said sections at the one voltage and connected in series with one of said sections and in parallel with the other of said sections at the other voltage, said sections consisting of a plurality of coils arranged on said stator to form poles of said alternate polarity, each said pole being formed of at least one coil from each said section, the coils of each said pole being arranged concentrically with each other and in different slots, said coils being formed of numbers of turns of wire suitable for substantially equalizing the ampere turns of adjacent poles.

2. A dual voltage single phase alternating current induction-type motor having a slotted stator including a main winding comprising two sections connected in parallel for operation at one voltage and connected in series for operation at another voltage, and a starting winding displaced from said main winding and connected in parallel with both said sections at the one voltage and connected in series with one of said sections and in parallel with the other of said sections at the other voltage, said sections consisting of a plurality of coils arranged on said stator to form poles of alternate polarity, each said pole being formed of at least one coil from each said section, the coils of each said pole being arranged concentrically with each other and in different slots, said poles being formed alike with equivalent coils of adjacent poles being formed from different ones of said sections, said coils being formed of numbers of turns of wire suitable for substantially equalizing the ampere-turns of adjacent poles.

No references cited.